United States Patent
Hunter et al.

(10) Patent No.: US 7,955,410 B2
(45) Date of Patent: Jun. 7, 2011

(54) METHOD OF RECOVERING SCRAP METAL

(76) Inventors: Glenn Hunter, Delta, OH (US); Dean Daenens, Defiance, OH (US)

(*) Notice: Subject to any disclaimer, the term of this patent is extended or adjusted under 35 U.S.C. 154(b) by 0 days.

(21) Appl. No.: 12/584,624

(22) Filed: Sep. 9, 2009

(65) Prior Publication Data

US 2010/0058891 A1    Mar. 11, 2010

Related U.S. Application Data

(60) Provisional application No. 61/191,562, filed on Sep. 10, 2008.

(51) Int. Cl.
*C22B 7/00* (2006.01)

(52) U.S. Cl. .......... 75/10.67; 241/24.14; 241/24.15; 209/227

(58) Field of Classification Search .......... 75/10.67; 241/24.14, 24.15; 209/227
See application file for complete search history.

(56) References Cited

U.S. PATENT DOCUMENTS

| | | | |
|---|---|---|---|
| 3,049,305 A | * | 8/1962 | Rath .............. 241/14 |
| 6,877,610 B2 | | 4/2005 | Boast |

* cited by examiner

*Primary Examiner* — George Wyszomierski
*Assistant Examiner* — Tima M McGuthry-Banks
(74) *Attorney, Agent, or Firm* — Emch, Schaffer, Schaub & Porcello Co., L.P.A.

(57) ABSTRACT

A method of removing iron from waste slag from a steel producing furnace that reduces the size of the waste slag to slag particles in a reduction zone. The slag particles are advanced along a conveyor in a first direction. A first and second magnet are positioned adjacent the conveyor to remove slag particles that have a sufficient iron content to be attached by the first and second magnets. A first removal belt is advanced between the first magnet and the conveyor to remove slag particles removed from the conveyor by the first magnet. A second removal belt is advanced between the second magnet and the conveyor to remove slag particles removed from the conveyor by the second magnet. A first and second separation screens are positioned along the conveyor to remove particles not removed by the first or second magnets that are small enough to pass through the first and second separation screens.

3 Claims, 1 Drawing Sheet

METHOD OF RECOVERING SCRAP METAL

CROSS REFERENCE TO RELATED APPLICATIONS

This application claims the benefit of U.S. provisional patent application Ser. No. 61/191,562 filed on Sep. 10, 2008.

BACKGROUND OF THE INVENTION

The present invention is generally directed to a method of recovering scrap metal. More particularly the invention is directed to a method of recovering iron waste slag from a steel producing furnace.

In the production of steel there is always a layer of slag that covers the open top of the steel furnace. The slag is used to retain heat in the furnace and also can contain impurities that are driven out of the steel during the steel making process. The slag can also be utilized to add desirable components to the steel or contain components that will pull unneeded impurities from the steel that is being produced.

In the slag there is always a certain percentage of steel or iron that gets trapped in the slag that is produced during the steel manufacturing process. Steel producers have for years attempted to recover large pieces of steel or iron trapped in the waste slag that is a residue from the production of the steel. However, the effort of the steel companies has been to remove verily large pieces of iron or steel that is easily removed from the slag. This has resulted in a waste slag product that has a significant portion of iron or steel that is not recovered. Part of the reason that the steel producers have not attempted to recover this component of steel or iron from the waste slag is that the concentration of iron or steel was not high enough to readily make the material reusable in the steel producing process. With the increase in price for raw steel, the iron used to produce steel and the energy necessary to produce steel, the steel contained in the waste slag has increased value and there is a need to recover the iron or steel from this waste slag. In addition, if the iron or steel can be removed from the waste slag there are uses for the aggregate form from the waste slag that are enhance with the removal or reduction of the steel or iron content in the aggregate. If the waste slag aggregate can also have a relatively uniform size there are even additional uses for such aggregate.

SUMMARY OF THE INVENTION

The present invention is directed to a method of recovering scrap metal. More particularly, the invention is directed to a method or removing iron from waste slag from a steel producing finance. The waste slag is reduced in size to particles in a reduction zone. The slag particles are advanced along a conveyor in a first direction from the reduction zone. A first magnet is positioned adjacent to the conveyor to remove slag particles having a sufficient iron content from the conveyor. The first magnet is movably positioned with respect to the conveyor to enhance the ability of the first magnet to remove slag particles having a sufficient iron content. A first removal belt is advanced between the first magnet and the conveyor in a direction that is disposed at an angle with respect to the first direction of movement of the conveyor. The first removal belt directs slag particles removed from the conveyor by the first magnet to a first collection location. The slag particles left on the conveyor are past over a first separation screen whereby slag particles that are small enough to pass through the first separation screen are removed from the conveyor. A second magnet is positioned adjacent the conveyor to remove slag particles have a sufficient iron content from the conveyor. The second magnet is movably positioned with respect to the conveyor to enhance the ability of the second magnet to remove slag particles having a sufficient iron content from the conveyor. A second removal belt is advanced between the second magnet and the conveyor in a direction that is disposed at an angle with respect to the first direction of movement of the conveyor. The second removal belt directs slag particles removed from the conveyor by the second magnet to a second collection location. The slag particles remaining on the conveyor are passed over a second separation screen whereby slag particles that are small enough to pass through the second separation screen are removed from the conveyor.

The slag particles remaining on the conveyor after advancement over the first and second separation screens are advanced back to the reduction zone. The slag particles advance back to the reduction zone are further reduced in size and again advanced along the conveyor to remove slag particles having a sufficient iron content to be separated from the conveyor by the first or second magnets.

The waste slag is reduced in size by the reduction zone so that the slag particles are removed from the conveyor if the slag particles contain a sufficient iron content or the slag particles do not have a sufficient iron content and are reduced in size whereby the slag particles can pass through first or second separation screens. The slag particles that pass through the first and second separation screens have a low iron content and have a uniformity of size that makes these slag particles particularly useful for aggregate for various applications. The iron content of the slag particles that are removed from the conveyor by the first and second magnet will have an iron content, by weight, of at least 50% which makes these particles particularly attractive for reuse in a steel producing furnace. In most applications the method of the present invention is capable of removing slag particles that have an iron content by weight of at least 80% which further enhances the usefulness of such iron containing particles in a steel producing process.

Other objects and advantages of the present invention will become apparent to those skilled in the art upon a review of the following detailed description of the preferred embodiments and the accompanying drawing.

DETAILED DESCRIPTION OF THE PREFERRED EMBODIMENT(S)

Figure 1:
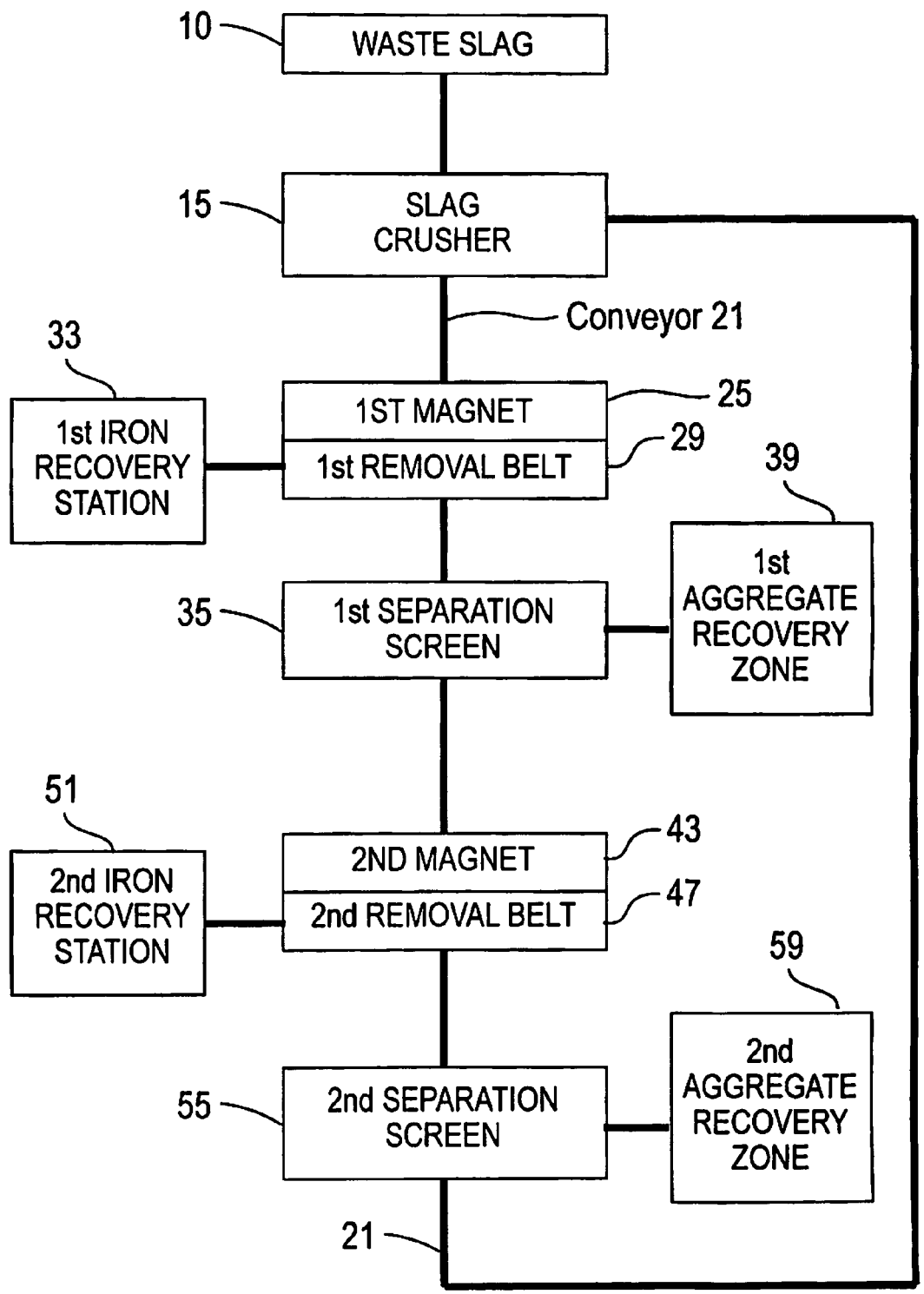
FIG. 1 is a schematic view of the invention of the present invention.

This invention relates to a method for removing iron or metal particles from waste slag from a steel processing furnace. More particularly, the method is directed to reducing the waste slag to small size particles wherein any significant iron or metallic content in the particle will cause the particle to be removed and further processed to recover the iron or metallic content. In addition, the method reduces the waste slag to a particular size particle that is discharged from the process if the particles do not contain a sufficient amount of iron or metallic content to warrant recycling. The discrete sized particles of waste material have a size uniformity that enhances the usability of the waste particles as aggregate for other applications. The waste slag is recycled through the method until the iron or metallic content that can be economically recovered is removed and the non-usable waste slag is reduced to a particle size that is suitable for use in various aggregate type applications. The features of the invention will be more readily understood by referring to the following description with reference to the attached drawing.

The method of the present invention is designed to recover iron from the waste slag that is produced from the furnaces in steel production mills. The slag that is a byproduct of the steel production facility contains various quantities of steel that have been picked up or enclosed within the slag during the steel manufacturing process. Normally such slag is processed by the steel mills to remove large particles of iron that are contained in the waste slag as the iron can be reclaimed and reused in the steel manufacturing furnaces. However, the steel mills have traditionally just removed fairly large pieces of iron or iron that is not significantly covered slag. However, after the mills have processed the waste slag there is usually a significant quantity of iron that is present in the waste slag that is traditionally not been further processed to recover the additional iron present in the waste slag. With increased cost for processing steel and the high cost of scrap materials that can be reused in a steel mill there has been a need for a method that can effectively recover a larger quantity or portion of the iron that is present in the waste slag produced by the steel processing furnace. If the material that is removed from the waste slag has an iron content of at least 60% or greater the iron can be recycled into a steel producing furnace to recover the scrap iron contained in the waste slag that was thrown away by the steel mills. The higher the iron content in the material that is recovered from the waste slag the more usable and valuable is the iron recovery process. In practice it has been found that steel mills are particularly interested in having a recovery process that can produce a residual material that has an 80% or greater concentration of iron by weight in the recycled material.

The method of iron recovery of this invention is shown diagrammatically in FIG. 1. The basic machine that is used in this process is a Pegson Terex model 4242SR that has been modified to accomplish the features of the present invention. U.S. Pat. No. 6,877,610 shows the basic features of this equipment and is specifically incorporated by reference into this patent application. A quantity of waste slag 10 having a recoverable iron content is deposited into a slag crusher 15 that is utilized to reduce the slag into smaller size particles wherein the iron content in such particles can be recovered or to separate the iron content from the waste slag to facilitate recovery of the iron content. The slag crusher is essentially a rock crusher type of device that acts upon the waste slag 10 to reduce the size of the particles contained in the waste slag. The waste slag has essentially two components which are the slag which is comprised of waste products or impurities and the scrap iron which is contained in or bonded to the slag. The slag component of the waste slag is readily reducible in size by the slag crusher as the components of the slag are relatively brittle in the type of material that the slag crusher is designed to reduce in size. The iron content in the waste slag 10 is very hard and generally not crushable or reducible in size by the slag crusher. Accordingly, the slag crusher 15 essentially acts upon the slag component of the waste slag and reduces the size of the waste slag particles. As the waste slag has normally already been processed by the steel mill, large pieces of scrap iron in the waste slag have already been removed and generally only relatively small pieces of iron or small pieces of iron encapsulated in or bonded to slag remain in the waste slag. Since there are generally no large pieces of scrap iron in the waste slag this makes it easier for the slag crusher 15 to reduce the waste slag to smaller size particles.

When the waste slag has been adequately processed in the slag crusher 15 the waste slag is transferred from the slag crusher on to a conveyor 21 that advances the waste slag particles beneath a first magnet 25 and a first removal belt 29 that are positioned in spaced apart relationship to the conveyor 21. The first removal belt 29 is positioned between the first magnet 25 and the conveyor 21. The first removal belt 29 usually is disposed so that it travels or advances in a direction that is substantially perpendicular to the direction of travel or advancement of the conveyor 21. The first magnet 25 usually is a permanent magnet having sufficient magnetic attraction to remove particles from the conveyor 21 that have an iron content of at least 10% based on the weight of the particle. Usually the first magnet 25 is positioned above the conveyor 21 and the magnet will cause the particles having a sufficient iron content to be lifted from the conveyor in a direction towards the first magnet 25. As the particles having a sufficient iron content are lifted from the conveyor 21 the first removal belt 29 will engage the particles having a sufficient iron content and advance these particles in a direction substantially perpendicular to the direction of travel of the conveyor 21 and cause the particles to be directed to a first iron recovery station 33. The particles that are directed to the first iron recovery station 33 will have an iron content, based on the weight of the particle that is sufficient to make these particles usable as recovered iron scrap for steel processing furnaces.

The first magnet 25 must be positioned sufficiently close to the conveyor 21 so that the first magnet can effectively lift the desired particles from the surface of the conveyor 21 and advance them in a direction towards the first magnet. The ability of the first magnet to remove the desired particles is based upon the strength of the first magnet 25 and the distance that the first magnet 25 is based from the conveyor 21. In practice it has been found that a permanent magnet can be provided that has sufficient magnetic attraction to remove particles having a desired iron content if the first magnet is spaced from about 0.5 inches to about 14 inches from the surface of the conveyor 21. In practice it has been found to be preferable to have the first magnet spaced from about 8 inches to about 10 inches above the conveyor. The first removal belt 29 is positioned between the first magnet 25 and the conveyor 21. The first magnet 25 must of sufficient strength that it can assert the necessary magnetic attraction on the particles on the conveyor 21 through the first removal belt 29. Usually the first removal belt 29 is positioned immediately adjacent the first magnet so that the first removal belt does not cause the first magnet 25 to be spaced from the conveyor 21 a distance any larger than necessary. If the first magnet 25 is spaced too far from the conveyor 21 it will be necessary to increase the strength and therefore the cost of the magnet to have the magnet function in the necessary manner. The first removal belt is advanced at a speed that is sufficient so that particles removed from the conveyor 21 by the first magnet 25 are engage by the first removal belt with sufficient force to direct the particles to the first iron recovery station 33.

The positioning of the first magnet and the first removal belt are very dependent upon the size of the waste slag particles on the conveyor 21. It is important that the first magnet be positioned as close as possible to the particles on the conveyor 21 so that a significantly large portion of the iron content contained in the waste slag is acted upon by the first magnet to remove the iron containing waste slag particles from the conveyor 21 in a direction towards the first magnet 25. If the first magnet is spaced too far from the conveyor 21 not all of the desirable waste slag particles having a sufficient iron content will be removed from the conveyor 21. At the same time the first magnet and the first removal belt 29 cannot be positioned so close to the conveyor 21 that the first removal belt 29 acts to just sweep slag particles from the conveyor 21 that have not been lifted from the conveyor 21 by the first magnet 25. It is important that during the operation of the process of this invention that the first magnet 25 and the first removal belt 29 be adjustably positioned with respect to the conveyor 21 based on the size of the slag particles that are contained on the conveyor 21. As the slag crusher 15 reduces the size of the slag particles the first magnet 25 and the removal belt 29 can be advanced or adjusted in a direction towards the conveyor 21 to an increase the effectiveness of the first magnet 25 in removing slag particles from the conveyor 21 that have a sufficient iron content based on the weight of the slag particle.

The waste slag particles on the conveyor 21 that move past the first magnet 25 without being removed from the conveyor 21 pass over first separation screen 35. The first separation screen has a plurality of openings that have a size from about ⅛ inch to about inches and waste slag particles that are smaller than the openings in the first separation screen 35 falls from the first separation screen and are collected in first aggregate recovery zone 39. In practice it has been found that opening from about 1 inch to about 1½ inches is preferred for the first separation screen. The waste slag particles that are removed by the first separation screen 35 are small enough that if was any significant iron content in the particle that it should have been removed from the conveyor 21 by the first magnet 25. As the small sized particles were not removed by the first magnet there is usually not a sufficient iron content in the particle to warrant further processing to attempt to recover any such iron content that might be present. Accordingly, the particles removed by the first separation screen can be removed from the iron recovery process and used for aggregate or filler in other processes or applications. Since the first separation screen 35 has uniformed openings the waste slag particles that are removed by the first separation screen 35 are relatively uniformed in size and such particles would be the size of the openings in the first separation screen 35 or smaller. Since the slag particles in the first aggregate recovery zone 39 have a set uniformity of size, these waste slag particles have more defined usability in further processes requiring aggregate or filler materials.

The waste slag particles on the conveyor 21 that pass through the first separation screen 35 are advanced past a second magnet 43 and a second removal belt 47 that are positioned above the conveyor 21. The second magnet and the second removal belt function essentially in the same manner as the first magnet and the first removal belt previously described. However, the second magnet 43 can have a magnetic attraction that differs from the first magnet 25 if it is found desirable to vary the magnetic attraction of the two magnets to maximize the scrap recovery of the process. The second removal belt 47 can also be advanced at a different rate of speed than the first removal belt if that is found to be desirable. However, the second removal belt advances in a direction that is substantially perpendicular to the conveyor 21 as previously described with respect to the first removal belt 29. Waste slag particles that are removed from the conveyor 21 by the second magnet 43 are engaged by the second removal belt 47 and directed to a second iron recovery station 51 in the same manner as previously described. The second magnet 43 is movably positioned with respect to the conveyor 21 and the second magnet is usually positioned from about 0.5 inches to about 7 inches above the conveyer 21. In practice it has been found preferable to position the second magnet from about 6 inches to about 8 inches from the conveyer. As larger waste slag particles having sufficient iron content have been removed by the conveyor 21 by the first magnet 25 there are usually smaller sized waste slag particles on the conveyor 21 in the area of the second magnet 43. Accordingly, the second magnet 43 is usually positioned closer to the conveyor 21 than the first magnet 25. This allows the second magnet 43 to be more effective in advancing smaller sized waste slag particles having a sufficient iron content away from the conveyor 21 for engagement with the second removal belt 47.

Waste slag particles on the conveyor 21 that are not removed by the second magnet 43 are advanced over a second separation screen 55 the second separation screen 55 has a plurality of openings that are from about ⅛ inch to about ¾ inch in size with a preferred size of ¼ inch to ½ inch. Waste slag particles that are smaller than the openings in the second separation screen 55 pass through the second separation screen and are directed to second aggregate recovery zone 59. Usually the waste slag particles removed by the second separation screen 55 are smaller in size than the waste slag particles removed by the first separation screen 35. As previously mentioned the waste slag particles in the second aggregate recovery zone 59 have a uniformity of size that make these particles particularly desirable for use in further processing that requires aggregate or filler materials. After passing the second separation screen 55 any waste slag particles on the conveyor 21 are directed back to the slag crusher 15 for further processing. It has been found that the waste slag can be crushed to a size that will pass through either the first separation screen or the second separation screen or that that the small sized waste slag particles will have a sufficient iron content so that these particles will be removed by the first magnet 25 or the second magnet 43 and be recycled in the steel manufacturing process. Essentially, if the waste slag particles are of a small enough size that the iron content in the particles have not caused them to be removed from the conveyor 21 by the first magnet 25 or the second magnet 43 and that the particles will pass through either the first separation screen 35 or the second separation screen 55 that there is not sufficient iron in such waste scrap particles to warrant further attempts to recover any such iron content.

It should be appreciate that it would be possible to add additional magnets and removal belts adjacent the conveyor 21 and additional separation screens adjacent the conveyor 21 in an attempt to recover even additional iron content from the waste slag produced by steel mills. However, in practice it has been found that two magnets and two separation screens provide an efficient recovery of scrap iron from the waste slag without overly increasing the cost of the processing of the waste slag.

To assist in achieving the high level of iron recovery, a special liquid freezing compound, such as nitrogen or similar materials, is used to soak the scrap from the steel mill plants. The liquid compound acts to soften the slag material around the iron. An electric current can also be supplied to the liquid to help to breakdown the slag and make it brittle. The slag that has been treated by the liquid compound and the electric current is then processed in a slag crusher to more effectively reduce the size of the slag. To further assist in reducing the size of the slag particles, a two bar system slag crusher is used to crush the material. The two bar system gives the the ability to sling the scrap at a much higher RPM rate against hardened blow plates. The higher velocity at which the slag strikes the harden plates reduces the size of the slag particles. An electric current can be supplied to the metal plates used in the crusher. The electric current breaks the ferrous metal away from the non-ferrous material to assist in reducing the size of the slag particles. In addition, rare earth magnets can be used for the first and second magnets to more effectively separate the slag containing iron from the scrap provided to the recovery system of this invention. The rare earth magnetics have a strong magnetic attraction and more efficiently remove the particles containing the desired iron content.

The above description is given solely for the sake of explanation of the invention. Various modifications and substitutions, other than those cited, can be made without departing from the scope of the following claims.

We claim:

1. A method for removing iron from waste slag from a steel producing furnace comprising:

reducing the size of the waste slag to slag particles in a reduction zone;

advancing the slag particles along a conveyor in a first direction;

positioning a first magnet adjacent to the conveyor, removing slag particles having a sufficient iron content from the conveyor with the first magnet, the first magnet being positioned from 8 to about 10 inches above the conveyor;

advancing a first removal belt between the first magnet the conveyor, the first removal belt being advanced in a direction that is disposed at an angle with respect to the first direction, the first removal belt directing slag particles removed from the conveyor by the first magnet to a first collection location;

passing the slag particles remaining on the conveyor after the first magnet over a first separation screen, the first separation screen having openings from 1 to about 1½ inches in size whereby slag particles that are small enough to pass through the first separation screen are removed from the conveyor;

positioning a second magnet adjacent to the conveyor, removing slag particles having a sufficient iron content from the conveyor with the second magnet, the second magnet being positioned from 6 to about 8 inches above the conveyor;

advancing a second removal belt between the second magnet and the conveyor, the second removal belt being advanced in a direction that is disposed at an angle with respect to the first direction, the second removal belt directing slag particles removed from the conveyor by the second magnet to a second collection location;

passing the slag particles remaining on the conveyor after the second magnet over a second separation screen, the second separation screen having openings from ¼ to about ½ inches in size whereby slag particles that are small enough to pass through the second separation screen are removed from the conveyor; and, advancing the slag particles remaining on the conveyor after advancement over the first and second separation screens to the reduction zone whereby the slag particles can be reduced in size and again advanced along the conveyor to remove slag particles having a sufficient iron content to be separated from the conveyor by the first or second magnets.

2. The method of claim 1 in which the first and second magnets are moveably positioned with respect to the conveyor whereby the first and second magnets can be positioned based on the size of the slag particles to increase the efficiency of the first and second magnets in removing slag particles containing iron from the conveyor.

3. The method of claim 1 in which the slag particles that are advanced from the conveyor to the reduction zone are combined with waste slag in the reduction zone.

* * * * *